April 18, 1961  W. SHOCKLEY  2,980,830
JUNCTION TRANSISTOR
Filed Aug. 22, 1956  5 Sheets-Sheet 1

FIG_1_

FIG_2_

FIG_5_

FIG_3_

FIG_4_

FIG_6_

INVENTOR.
William Shockley
BY
ATTORNEYS

April 18, 1961　　　W. SHOCKLEY　　　2,980,830
JUNCTION TRANSISTOR

Filed Aug. 22, 1956　　　　　　　　　　　　5 Sheets-Sheet 3

FIG_8_

INVENTOR.
William Shockley
BY
ATTORNEYS

April 18, 1961   W. SHOCKLEY   2,980,830
JUNCTION TRANSISTOR

Filed Aug. 22, 1956   5 Sheets-Sheet 4

FIG_10_

FIG_11_

FIG_12_

FIG_13_

INVENTOR.
William Shockley
BY
ATTORNEYS

FIG_14_

FIG_15_

FIG_16_

United States Patent Office 2,980,830
Patented Apr. 18, 1961

2,980,830

JUNCTION TRANSISTOR

William Shockley, 23466 Corta Via, Los Altos, Calif.

Filed Aug. 22, 1956, Ser. No. 605,646

26 Claims. (Cl. 317—235)

This invention relates generally to a junction transistor and more particularly to a junction transistor having relatively low base resistance.

Junction transistors are constructed by the diffusion method, the grown junction method and the rate grown junction method. The diffusion method is generally employed to construct transistors having relatively high alpha cut-off frequencies. These transistors include a collector body which is a relatively massive block having an ohmic contact formed on one face. The base layer is a relatively thin layer which is in the order of 1 mil wide by 6 mils long for high frequency transistors. Ohmic contact is made along one edge of the base layer. The emitter body is likewise a relatively thin layer which overlies the base layer. Ohmic contact is made on the upper face.

As is well-known, the alpha cut-off frequency of the base layer in a junction transistor is dependent upon the thickness. The gain of the transistor and its high frequency behavior depends also on the resistance of the base layer. If the length and width of the base layer are held constant and the thickness decreased, the resistance per unit length is increased. Since both resistance and thickness affect the alpha cut-off frequency, nothing is gained by reducing the thickness and holding the other dimensions constant. However, the resistance may be decreased by making the base layer relatively narrow. This leads to an extremely small structure since, in practice, it may be necessary to reduce the width of the base layer to a fraction of a thousandth of an inch in order to take advantage of attainable base layer thicknesses. Such small structures are difficult to fabricate, and the power capacity of the transistors is limited.

One method which has been proposed for reducing the base resistance and yet maintain base dimensions is to form a grid-like metallic structure in the base. One disadvantage with this method is that it necessitates placing metal electrodes in the body of the semiconductor within the base layer and this is impractical for very thin base layers.

It is a general object of the present invention to provide an improved junction transistor structure and method for constructing the same.

It is another object of the present invention to provide a transistor structure in which the base layer resistance is relatively low.

It is another object of the present invention to provide a junction transistor having relatively high alpha cut-off frequencies.

It is another object of the present invention to provide a junction transistor having a relatively high power capacity.

It is another object of the present invention to provide a junction transistor having relatively high alpha cut-off frequencies and high power-handling capacity.

It is another object of the present invention to provide a junction transistor structure in which the base layer is formed of varying thickness.

It is still another object of the present invention to provide a transistor having a base layer which consists of a web and rib structure.

It is a further object of the present invention to provide a transistor having a base layer which comprises a web and rib structure and in which the ribs have a higher carrier concentration.

It is another object of the present invention to facilitate and improve connections to a restricted zone in a semi-conductive body.

It is another object of the present invention to provide a method for the fabrication of a junction transistor of the above type.

The invention possesses other objects and features of advantage, some of which, with the foregoing, will be set forth in the following description of the invention. It is to be understood, of course, that the invention is not to be limited to the particular disclosure of species of the invention, as other variant embodiments may be adopted within the scope of the appended claims.

Referring to the drawing:

Figures 7A–H show a suitable method for fabricating a junction transistor having a base layer of varying thickness;

Figures 8A–I show another embodiment of the invention and method for fabricating the same; the figure includes curves showing the chemical charge density at various stages of construction;

Figures 1, 2:
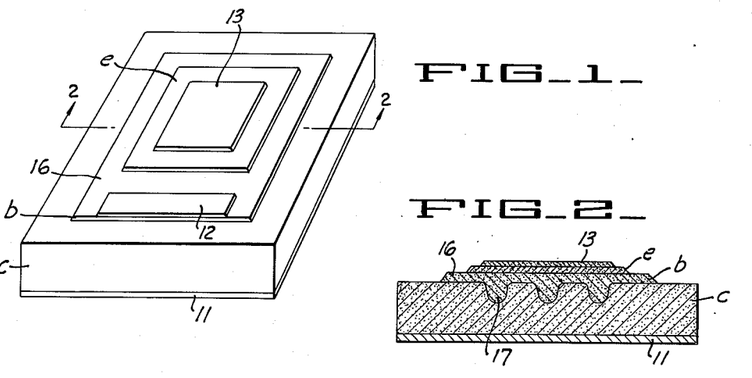
Figure 1 shows diagrammatically a junction transistor illustrative of one embodiment of the invention.
Figure 2 is a sectional view taken along the line 2—2 of Figure 1.

Referring to Figures 1 and 2, a junction transistor having a high conductivity base region of varying thickness is shown. The transistor comprises a relatively massive collector block $c$ of semi-conductive material of one conductivity type, for example p-type germanium or silicon, with ohmic contact 11, base layer $b$ of semi-conductive material of opposite conductivity type, for example n-type germanium or silicon, with ohmic contact 12 along one edge thereof, and an emitter region $e$ also of suitable semi-conductive material of the same conductivity type as the collector (p-type germanium or silicon), with ohmic contact 13.

Referring particularly to Figure 2, the base region is formed with webs or plates 16 having ribs or struts 17. Thus, the base consists of thin webs lying between thicker longitudinal ribs. Ohmic contact is made to the edge of the base layer and ends of the ribs with the ribs disposed generally perpendicular thereto.

It is apparent that the ribs add appreciably to the conductivity of the base layer in the direction of the ribs and thus that the base resistance will be decreased. Thus any small area of web has a relatively low resistance path through rib material to the base metallic contact compared to the path it would have if the base layer were of uniform thickness and composed entirely of web. In effect, the rib material connects the metal contact, through a relatively low resistance path, to the edges of relatively narrow areas of web material, thus reducing the resistance from any part of the web to the base contact. As a consequence the average distance of all parts of the web from the ribs is substantially less than the average distance of all parts of the web from the base contact.

Due to the larger thickness of the ribs, the alpha cut-off frequency for them is much lower than for the web portion of the base between the ribs. Current flowing between base and emitter that enters the ribs will not contribute appreciably to the over-all alpha of the transistor when the operating frequency lies between the alpha cut-off frequency for the web region and the alpha cut-off frequency for the rib region. As will presently be described, however, the injected current entering the rib region is much smaller than that entering the web region; therefore, the reduction of alpha due to ribs is much smaller than the proportional area of the base occupied by ribs. From quantitative considerations of the relative importance of the alpha value and the value of the base resistance, it can readily be shown that transistors of improved performance will result with a ribbed base structure.

The importance of base resistance in controlling the gain of junction transistors is well-known. A discussion given in considerable detail will be found in an article entitled "A Junction Transistor Tetrode for High Frequency Use" by R. L. Wallace, Jr., L. G. Schimpf, Proceedings of the IRE, volume 40, page 1395, November 1952. An appreciation of some of the main features of the foregoing article can be obtained by considering an approximate equivalent circuit for a junction transistor operating at small signals. Such an equivalent circuit is shown for a ground base transistor in Figure 3.

Figure 3:
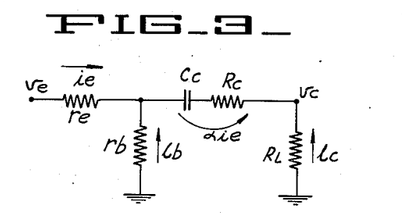
Figure 3 is an equivalent small signal circuit for a junction transistor.

The circuit includes a grounded load $R_L$ which is connected between the collector and ground. The equivalent collector spreading resistance $R_c$ and capacitance $C_c$ are shown serially connected between the load $R_L$ and the common junction of the resistors $r_e$ and $r_b$, the emitter and base resistance respectively. The other side of the base resistance is grounded. The voltages appearing at the emitter and collector are given respectively by $v_e$ and $v_c$. The various currents flowing in the transistor are given by $i_e$, $i_b$, and $i_c$. The alpha of the circuit is given by $\alpha$ and the equivalent current generator in the collector is shown as $\alpha i_e$.

If we assume that the transistor is being driven by a source supplying an alternating current $i_e$, then the effect of $r_b$, the base resistance, decreases the power gain by both decreasing the power output of the transistor for a given value of $i_e$ and also by increasing the power required to drive the amplifier. For example, even if the collector capacity $C_c$ were zero, the base resistance $r_b$ has a serious effect. For the model shown in Figure 3 with $C_c$ equal to zero, the power output is fixed since the power output is not altered by increasing $r_b$. However, the input power required increases with increasing $r_b$ since the input impedance is $r_e + r_b(1-\alpha)$. The presence of collector capacity accents the degradation due to $r_b$ since any increase in $r_b$ makes the capacitor a more attractive path for the current from the equivalent current generator $\alpha i_e$ in the collector circuit and correspondingly decreases the power output.

By applying Kirkoff's laws to the equivalent circuit and solving for $i_c$ in terms of $i_e$ the A.-C. power in the load is given by $$P_{ac} = \frac{(\alpha^2 + \omega^2 C_c^2 r_b) R_L |i_e|^2}{2[1 + \omega^2 C_c^2 (R_L + R_c + r_b)^2]}$$

The relative importance of decrease in alpha compared to the presence of base resistance may be appreciated by noting that if $r_b$ and $C_c$ were zero, then the power gain would be proportional to $\alpha^2$. On the other hand if alpha remains unity then an appreciable loss in output power will occur when the quantity $$\omega^2 C_c^2 (R_L + R_c + r_b)^2$$

becomes comparable to unity. As pointed out by Lee in the reference cited below, the influence in a diffused base germanium transistor of $C_c$, $r_b$ and $R_c$ may be such as to produce the major contribution to the "observed alpha-cut-off" and he introduces a frequency $$f_c = \frac{1}{2\pi C_c (r_b + R_c)}$$

to describe this effect. It is thus evident that if $f_a$, the cut-off frequency for the web, is substantially greater than $f_c$ then there will be significant loss in gain below $f_a$. From these considerations it is clear that reduction of $r_b$ is desirable in junction transistors and that this is especially true at frequencies approaching $f_a$ or $f_c$. It is also evident that reduction of $C_c$ and $R_c$ is also desirable.

Figure 4:
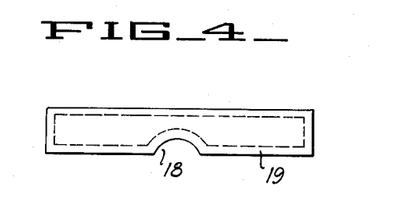
Figure 4 is an enlarged view of a suitable collector region for a junction transistor of this invention.

The "spreading" or "bulk" resistance of the collector body $R_c$ may be reduced to an arbitrarily small value by a variety of well-known techniques. For example, very heavily doped material may be used in the body of the collector and a lowly doped region formed near the surface by heat treating to diffuse impurities. Alternately, the collector region may be made very thin. This need not be done over the entire volume of the specimen. For example, as shown in Figure 4, a dimple 18 may be cut into the specimen by jet electrolytic etching; then a very heavily doped layer 19 may be formed by diffusion, the top layer is polished away leaving a blank with weakly doped material backed up at a short distance by a highly conducting layer which constitutes the collector body.

The essential problem in reducing the $C_c(R_c + r_b)$ product, therefore, involves the reduction of the term $C_c r_b$, or reducing the value of either of these constants. This invention, as previously pointed out, provides a structure and method for reducing the base resistance $r_b$.

Figure 5:
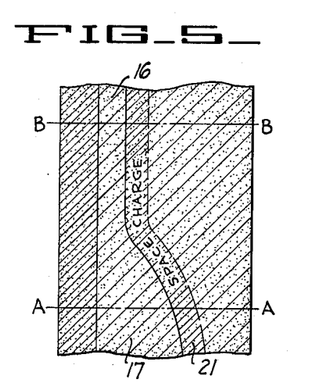
Figure 5 is an enlarged view of a portion of a web and rib of Figure 1.
Figure 6:
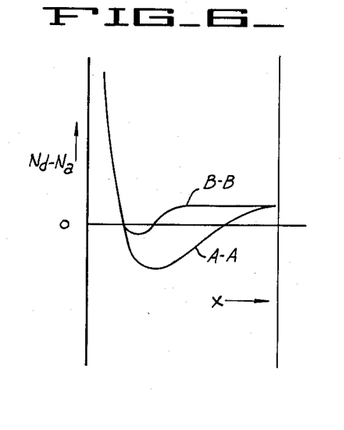
Figure 6 is a curve showing the chemical charge density along the lines A—A and B—B of Figure 5.

In order more clearly to understand operation of the web and rib structure, the interplay of several factors should be considered. This may be more clearly understood with reference to Figures 5 and 6. Figure 5 shows a portion of one rib 17 and a portion of the working web 16 between the ribs. Figure 6 shows the chemical charge density $N_d - N_a$ along the lines A—A and B—B of Figure 5.

Referring particularly to Figure 6, it is noted that the chemical charge density rises to a much higher value in the rib than in the web between the ribs, thus leading to a higher conductivity in the ribs. This is achieved by heavily doping the rib area and forming a web area which has less doping. The gradient or chemical charge density at the emitter and collector junctions are approximately the same for the rib region as for the corresponding junctions of the web region. A structure having essentially these characteristics can be produced by a number of techniques, some of which will be presently described.

The flow of injected carrier from emitter into the base is much greater per unit area in the web region than in the rib region because the web region is both thinner and less heavily doped than the rib region. As is well-known, the current density into a base varies approximately inversely as the product of these two factors. By proper selection of dimensions and doping, the product of these two factors may be controlled. Assuming the product is 10, current density in the rib is then about 1/10 the web current density. The alpha cut-off frequency for the rib will be approximately ten times lower than that for the web so that at frequencies approaching the alpha cut-off for the web the current in the rib will be largely ineffective and the alpha of the transistor will be reduced. The reduction will not be great, alpha values of about 0.9 will result even for cases in which the rib width is approximately equal to the web width, as will be presently described.

Assuming, for purposes of discussion, that the emitter body is much more heavily doped than the web region and that it is comparatively thick, the emitter junction injection efficiency approaches unity. For a thin web region, the fraction beta ($\beta$) of injected carriers which reach the collector junction will also be near unity so that, if all the base layer were a web, alpha would be near unity (in keeping with the quoted values of 0.98 or higher for diffused base transistors).

For a transistor having equal rib and web width, and operating at frequencies between the rib and the web alpha cut-off frequencies, the emitter current will contain approximately ten percent component of rib current for which alpha is nearly zero. Thus, the over-all alpha for the transistor will be the average value of alpha for the rib and web regions or 10% of zero plus 90% of 0.98 which equals 0.88. It is apparent that this leads to a reduction in power gain. Compared to the power gain with an alpha of 0.98, the reduction is 19% in the frequency range over which the gain is determined by the alpha of the web only.

Corresponding to the 10% reduction in alpha discussed above there will be a decrease in base resistance of approximately fivefold. This follows from the fact that the conductance in the base layer parallel to the rib direction arises chiefly from the ribs which have a conductance in each unit of length approximately 10 times as great as in the adjacent region of web, for the example in which rib and web widths are equal. If we compare this with a transistor in which each rib is replaced by a region of web then the two parallel strips of plate material will have a conductance for a unit length of two units compared to a conductance of approximately 11 units for a rib and web in parallel. On the basis of this it would appear that the base resistance is reduced by approximately a factor of 5.5. This calculation neglects the fact that there is some resistance to current flow from the ribs to the central portion of the web between the ribs. The importance of this transverse flow in the rib structure will depend upon the base dimensions in any particluar case.

The capacity of the collector junction will be approximately the same for the ribbed and unribbed structures since this capacity arises from the space charge region 21 (Figure 5) of the collector junction and depends upon the concentration gradient of chemical charge density at the collector junction and the collector voltage.

Thus, for the example discussed above, the rib structure will reduce the product $C_c r_b$ by approximately fivefold, permitting operation at five times the frequency so far as this limit is concerned. Alternately, the same $C_c r_b$ value can obtain with larger dimensions with the rib structure, thereby permitting higher power-handling capacities.

Summarizing, the introduction of ribs may be used either to improve the high frequency performance, or to increase the dimensions which results in ease of fabrication and better power-handling capacity, or a compromise of the two.

The techniques for producing layers doped by donors or acceptors by diffusion have been extensively investigated for silicon and germanium. The data for silicon is conveniently available in the article "Diffusion of Donor and Acceptor Elements in Silicon" by C. S. Fuller and J. A. Ditzenberger, Journal of Applied Physics, May, 1956, volume 27, page 544. In this article, the dependence of diffusion constant on temperature and impurity type are presented.

For the purposes of the following explanations the reader should be familiar with the concept of the diffusion constant denoted by D and the diffusion distance which is given by the formula $Dt$ where $t$ is the time of diffusion. If a source of impurities is maintained at the surface of a silicon crystal for a time $t$, for example by exposing the surface to a gas containing the impurity, then the concentration within the surface will build up to an equilibrium value $C_0$, dependent on the gas pressure and temperature, and the impurities will be distributed by diffusion to a depth below the surface in a way calculable from the laws of diffusion. The concentration drops rapidly to small fractions of $C_0$ at depths greater than twice the diffusion distance and the majority of impurity atoms are found within one diffusion length from the surface. It is evident that by controlling the nature and source strength of the impurity atoms, the temperature and the time, a large measure of control of the density of donors $N_d$ and of acceptors $N_a$ below the surface can be achieved. The mathematical theory of the diffusion equation is well developed and can be found in many treatises on the theory of heat and the methods of theoretical physics. Curves for the distributions of donors and acceptors based on surface concentrations and diffusion constants and times can readily be computed for specific cases for the structures presently described. For this reason the curves shown in the figures are intended to illustrate important qualitative features rather than exact quantitative results.

Employment of these techniques for making diffused base transistors are well-known and have been described for germanium by C. A. Lee in an article "A High Frequency Diffused Base Germanium Transistor," Bell System Technical Journal, January 1955, vol. 35, page 23, and for silicon by M. Tanenbaum and D. E. Thomas, "Diffused Emitter and Base Transistors" in the same journal on page 1.

The dimensions of typical transistor structures of the invention may be essentially the same as those discussed in these articles save that the dimensions of the base regions may be made larger for similar high frequency performance characteristics, as previously described. Thus the plate regions may be of the order of one micron (or $10^{-4}$ cm.) in thickness and donor and acceptor concentrations may be of the order of $10^{16}$ to $10^{19}$ cm.$^{-3}$. Because the rib regions need not be involved in transmitting injected carriers, higher donor and acceptor concentrations are permissible for them and thus advantage may be taken of the impurities of high solubility.

The density of impurities in a semiconductor may be made higher than the values permitted by phase diagrams. For example, ions of donors or acceptors may be made to bombard the surface with sufficient energies to penetrate several atomic layers and the density may be built up to high values by this means. Such high densities are unstable and tend to lower their concentration by precipitation or diffusion. However, they may be preserved at room temperature in the supersaturated condition. Higher concentrations may also be produced by bombarding the surface by alpha particles or high energy electrons (say 2 million electron volts) so as to produce abnormally high concentrations of vacant silicon sites. These will diffuse to the surface and will tend to draw inward impurities on the surface.

Figures 7, 9:
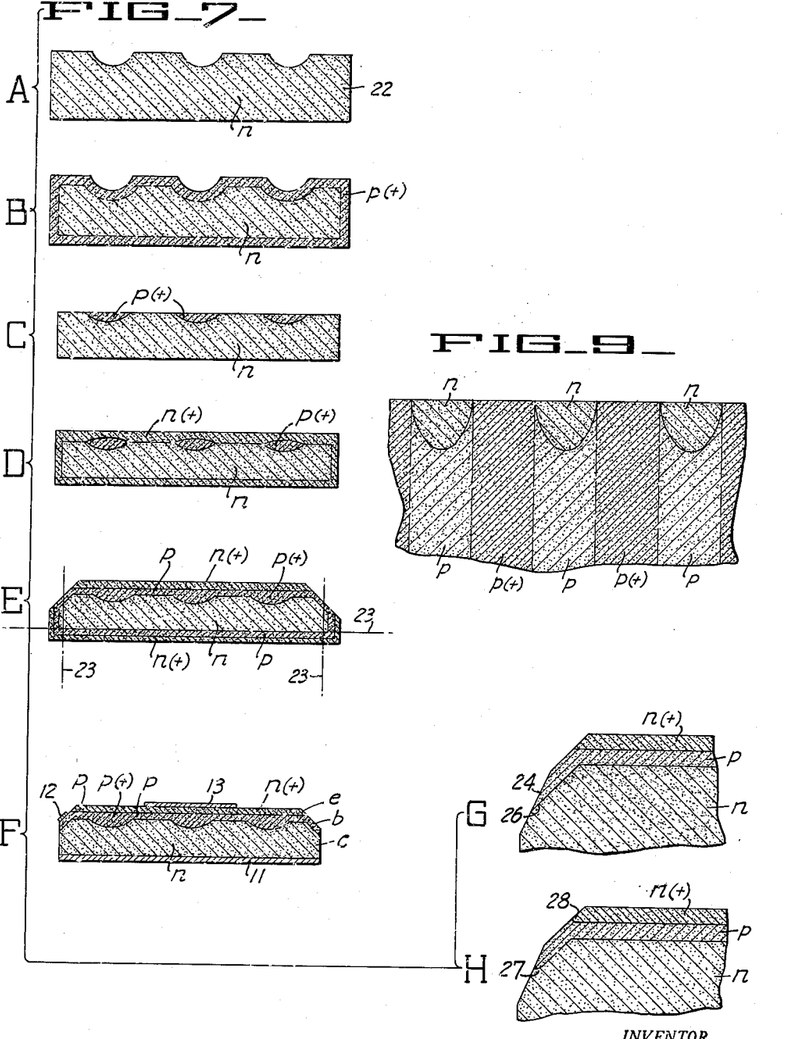
Figure 9 shows another embodiment of the invention and method for forming the base region of the same.

The diffusion technique lends itself nicely to fabricating the novel structure of the invention. One method of fabricating the structure is shown in Figure 7. A block of semiconductor material 22, for example n-type, is grooved on the top surface so as to produce an outer profile in cross section like that shown in Figure 7A. Any one of a large number of techniques may be used for grooving. The grooves may be cut with a very fine saw, such as is used for slicing crystals of silicon or germanium into small wafers for use in making semiconductor devices. For the present purpose, of course, the saw cuts are made very shallow. Subsequent to the cutting, the surface may be etched so as to remove surface damage in the first few microns of surface.

Lapping and polishing techniques may be used. Alternatively, chemical etches may be used. For this purpose, it is necessary to protect some, but not all, of the surface. This may be accomplished by laying the protective coating down in the regions in which it is not desired to produce grooves and then etching the surface chemically or electrochemically through the spaces in the protective coating. The protective coating may initially cover the entire surface and the openings for the grooves may be made by removing strips of the protective coating, for example by making scratches through the coating. It is evident that photoengraving techniques may also be used. Evaporation of gold or $SiO_2$ or other protective coatings may be used and the areas to be etched may be shielded, for example by small wires.

For the purpose of making extremely small grooves, it is possible to make use of electrochemical techniques combined with exceedingly fine wires known as "whiskers" such as are discussed by S. S. Brenner, Acta Metallurgica, vol. 4, pages 62–74, January 1956. These whiskers have been observed in a number of cases and are smaller than any actual drawn wires. A whisker used as an electrode for electroetching may thus be employed to produce extremely narrow electroetched grooves. Whiskers of one metal may be coated with more chemically resistant metals.

Figure 7B illustrates the structure produced on the grooved block by diffusion in the presence of a high concentration acceptor impurity. Under the conditions, a layer of controllable thickness of strongly p-type material, denoted by $p(+)$ is produced below the surface. The resulting p-n junction follows the contours established by the grooves. Figure 7C illustrates the next step of the process in which the specimen is reduced in size by lapping, cutting with a saw, or polishing. This operation leaves a set of strongly p-type struts or ribs inserted in the surface of the block.

The specimen as prepared in Figure 7C is then exposed to diffusion in the presence of a high concentration donor impurity to form a strongly n-type layer denoted by $n(+)$, which enters the surface as shown in Figure 7D. Simultaneously, the p-type impurities left in the ribs diffuse to somewhat greater depths and also diffuse out of the specimens at the surface, thus reducing the concentration of p-type material at the surface.

In the case of silicon, all of the acceptors from the third column of the periodic table, with the exception of boron and indium, diffuse substantially faster than the donors. For example, aluminum at 1250° has a diffusion constant approximately 30 times larger than antimony. Because of this difference in diffusion constants, a subsequent diffusion in the presence of an acceptor, at weaker concentrations than the donors of Figure 7D, will result in the development of a p-type layer lying under the $n(+)$ layer of Figure 7D. Figure 7E shows the structure which results when the corners of Figure 7D are bevelled so as to remove the $n(+)$ layer at the corners and the structure is subjected to a subsequent diffusion in the presence of an acceptor, for example aluminum at 1250° in the case of silicon. The result is to develop a p-type base layer or web connecting the p-type ribs of Figure 7E. This produces the desired base layer structure having varying thickness. Simultaneously, an area suitable for a base contact is made since on the bevelled surfaces there was no $n(+)$ layer and hence an exposed p-type region suitable for a base contact is formed. The bevelling is carried out on all edges whereby base contact can be made to the ends of the ribs.

It should be noted that after the diffusion discussed in connection with Figure 7E, a slight etch or polish may be necessary to produce the configuration shown in Figure 7E. The reason for this is that due to gaseous and surface diffusion, the entire surface of the specimen tends to acquire a uniform concentration of impurities in the first few layers of atoms. Actually this does not always occur and the surface of a specimen heated in a diffusion furnace may consist of n-type and p-type regions. This failure to reach equilibrium with the outside environment is thought to be due to rate limiting processes such as the formation of oxide layers. These rate limiting processes may lead to the structure of Figure 7E resulting directly from the diffusion run. If they do not, then a thin p-type skin may form over the $n(+)$ emitter layer which is depleted of donors at its surface by evaporation. This situation may be remedied by etching or polishing off the resulting p-type skin. Alternatively, a source of relatively slowly diffusing donors, such as arsenic or antimony for silicon, may be kept present so as to neutralize the acceptors on the surface, but not in depth. In this case an n-type skin will occur over the bevelled base contact regions of Figure 7E. This skin may be removed by additional bevelling operations.

As is illustrated in Figure 7E, the remaining unwanted material is lapped or cut or polished off along the line 23, and the exposed junctions are etched to improve their characteristics so as to result in a semiconductor structure suitable for application of electrodes as illustrated in Figure 7F.

The method described lends itself to a technique for improving the characteristics of collector junctions. Figures 7G and 7H illustrate the principles involved with some exaggeration of the possible bevel angles. A second bevelling operation 24 which gives a feather edge 26 to the p layer at the collector junction is carried out. It is evident that this feather edge will reduce the component of electric field along the surface when reverse voltages are applied across the collector junction. This effect will permit operation at higher collector voltages, since as is well-known, the reverse breakdown in a silicon p-n junction is dependent both on concentration gradient at the junction and on surface treatment. Figure 7H represents the effect of causing diffusion to occur after the bevelling operation of Figure 7G. The acceptors on the feather edge of the base layer diffuse in depth and thus reduce in concentration. This results in a contraction 27 of the base-collector junction as represented in Figure 7H. The concentration gradient across the junction itself is thus reduced near the surface. This configuration has the advantage over the situation of 7G of reducing collector capacitance and the magnitude of the electric field inside the surface. The same effect will occur at the base emitter junction 28 and this is also represented in Figure 7H.

Contacts may be made to the various regions as taught in the references on diffused base transistors referred to above. In the structures described, however, there is the advantage that the larger area emitter will facilitate making contact to the emitter by making it easier to evaporate a metal area electrode upon it. Also, the means proposed for exposing the base layer may be replaced by alloying with aluminum through the emitter layer to the p-type base layer in accordance with the method discussed by Tanenbaum and Lee in the cited reference. Also in the case of p-type emitter layers, use may be made of the fact that holes enhance electrolytic etching rates. Thus if the emitter is masked except for a desired area for base contact, the base is reverse biased, and electrolytic etching employed, then the exposed emitter layer may be etched away leaving the base layer ready for contact.

The grooving and bevelling techniques are well adapted to production of diffused base transistors in quantity. Thus, a specimen of silicon large enough to form many transistors may be polished and then in one continuous operation grooved over its entire area. The polishing and the bevelling cuts needed for the steps of Figure 7 may be taken by parallel lapping and polishing fixture so that a large number of transistor structures are fabricated on the surface simultaneously. The evaporation of emitter and base connection areas may take place through multiple openings in a mask for the entire specimen. Subsequent to these operations the units may be cut apart by saws or magnetostrictive cutters and the individual wafers mounted and packaged. It is also possible to carry out a soldering operation of all the collectors simultaneously to individual metal tabs prior to cutting the units apart.

Figure 8:
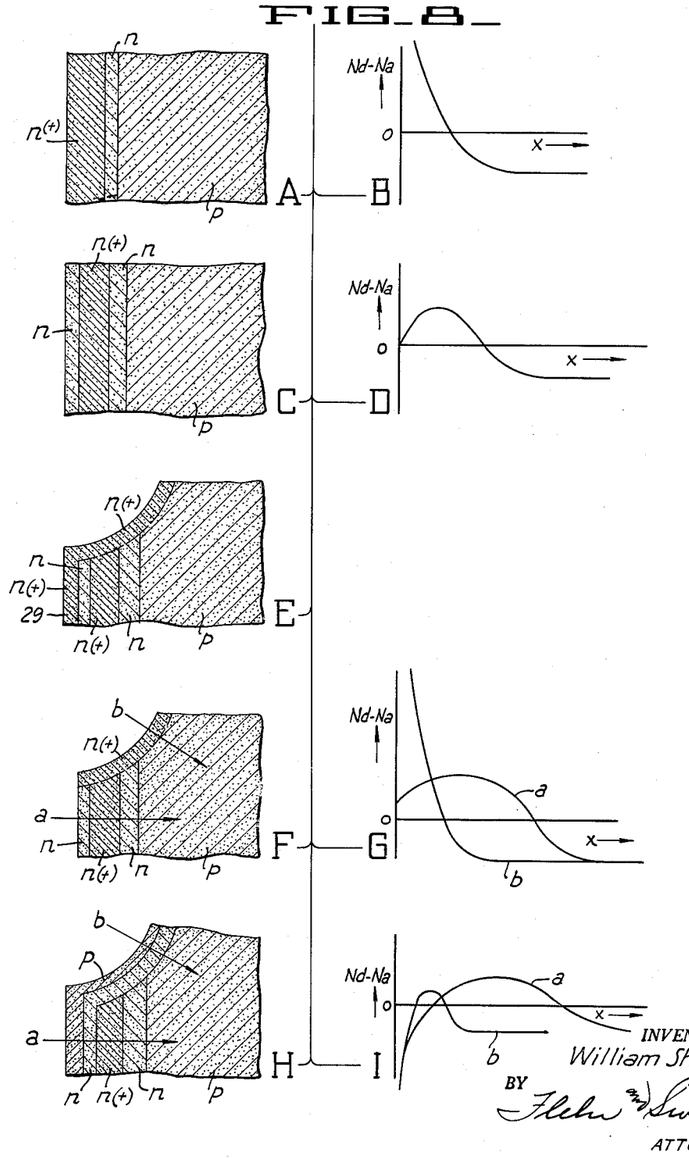

Figure 8 illustrates another method which may be employed to produce a transistor structure with a base having varying thicknesses. This method produces a smaller area interface between the ribs and collector, thus reducing the base collector capacity in comparison with the structure of Figure 7. Furthermore, a refinement of the procedure reduces the emitter base capacity in the area of the ribs.

Figure 8A represents a portion of the surface of a block of material which has been exposed to diffusion of donors so as to build a relatively thick and heavily doped n-type layer designated n(+) on the surface. This layer will subsequently compose the rib material. At this stage of the operation the surface is plain, the grooves being added later. The donor concentration due to diffusion is represented in Figure 8D. This corresponds to the case of a constant source strength during the diffusion process. For the purpose of subsequently reducing the rib-emitter capacity, an additional diffusion is carried out in Figure 8C. This is carried out in the absence of a source of donors so that the donors are lost from the surface by diffusion outwards. After this operation, the donor minus acceptor density in the specimen is approximately as shown in Figure 8D, the region of highest concentration being approximately a diffusion length below the surface. The next operation consists of forming a set of grooves in the surface. These grooves will subsequently constitute the web areas of the transistor, the spaces between the grooves constituting the ribs. After the grooves are prepared, a subsequent diffusion with donors is carried out. This results in a thin n-type layer with a high concentration near the surface over the entire surface of the specimen (Figure 8E). A cut is then made by polishing down the surface to a depth of the order of a micron to remove this heavily doped n-type layer over the surface 29 which is subsequently to become rib material. The resulting structure is shown at Figure 8F. The concentration gradients along the two lines A and B away from the surface are shown in Figure 8G. Polishing off the heavily doped n-type layer of high concentration gradient leaves a region of relatively low concentration and low concentration gradient over the plane surfaces.

The next operation consists of allowing acceptors to diffuse in from the surface during a subsequent diffusion treatment. This results in a p-n-p structure as shown in Figure 8H. The p-layer over the rib material is shown as substantially thicker than over the working region since in the neighborhood of the rib material the concentration of donors builds up only at a considerable depth below the surface. Thus the acceptors in this region convert the material to p-type relatively deeply below the surface. On the other hand, over the working region the second diffusion of donors produces a highly concentrated but thin layer of n-type material and the p-n junction is relatively near the surface. The concentration gradient along the two lines A and B away from the surface is shown at 8I.

The advantage of the configuration shown in Figure 8H is that a relatively low concentration gradient is present over the ribs. This leads to a p-n junction having a low transition capacity. On the other hand, the actual concentration of donors in the depth of the rib layer may be as high or higher than that in the web region provided the surface concentration during the initial diffusion was substantially higher than during the formation of the web region of the base. This will result in a reduction of diffusion capacity over the rib region. Furthermore, the area of collector junction per unit area of rib may be made somewhat smaller in Figure 8 than in Figure 7 because the junction between the rib and the collector body is plane whereas in Figure 7 it is convex inwards. Thus, the structure of Figure 8 will have less capacity per unit area than a comparable structure produced as illustrated in Figure 7.

Still another means of producing conducting ribs is illustrated in Figure 9. In this case a rate-grown p, p+ structure is prepared from a silicon melt containing both donors and acceptors. Since acceptors diffuse generally more rapidly than donors, a subsequent heat treatment in vacuum of this melt will lead to a loss of acceptors from the surface. The result of this will be to produce compensated regions which are n-type. This is illustrated in Figure 9. These regions may then be used as ribs to reduce base resistance in a manner similar to that discussed above. Alternatively, the compensation may be produced or enhanced by causing donors to diffuse in from the surface.

Figures 10-13 illustrate another form of rib structure and method for fabricating the same. In this structure, the emitter junction does not continue uniformly over the ribs of the base layer. This leads to an improvement in alpha and a reduction of capacity between emitter and base. Figure 10A illustrates the first of several steps in making the structure. A blank of heavily doped p-type material p(+) is first treated so as to produce a less heavily doped layer p(−) near the surface. Then a very heavily doped layer of n-type material n(++) is formed on the surface by diffusion. A relatively low-capacity junction separates the n(++) layer and the underlying block because of the light doping in the underlying block. The heavily doped n(++) layer will subsequently constitute the rib material. Next, grooves are cut in the structure, one of these being shown in Figure 10A.

Figures 10, 11, 12, 13:
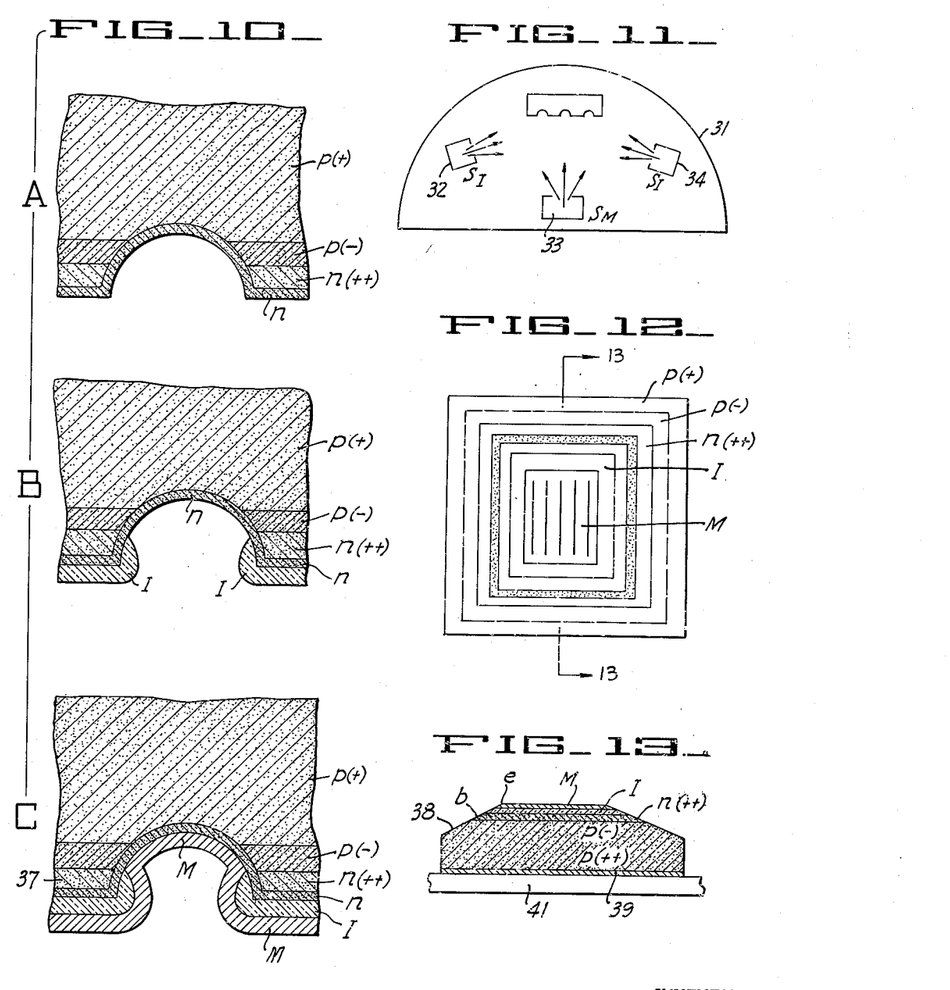
Figure 10 shows still another embodiment of the invention and method for constructing the same.
Figure 11 shows a vacuum chamber for applying suitable coatings to the embodiment of Figure 10.
Figure 12 is a top view of a transistor constructed in accordance with Figures 10 and 11.
Figure 13 is a sectional view taken along the lines 13—13 of Figure 12.

Subsequent to the above operations, an n-type layer which is to be used as the web portion of the transistor base is formed by diffusion. The next two steps in the fabrication are illustrated in Figures 10B and 10C. These involve evaporation in vacuum (Figure 11) of an insulating film and a metal film over the grooved structure. These operations may be carried out in a high vacuum bell jar 31 using sources 32, 33 and 34. First a layer I of insulating material, such as silica or magnesium fluoride, such as is evaporated from sources 32 and 34 located nearly in the plane of the grooved surface so that the evaporating molecules strike the specimen at grazing incidence. As represented in Figure 10B, this results in the formation of an insulating layer I over the surface except at the bottoms of the grooves which lie in shadow with respect to the sources of insulating material.

Subsequent to this operation, a metal layer is deposited from the source 34 located approximately directly in front of the face of the specimen. As illustrated in Figure 10C, this forms a continuous layer M of metal which reaches into the bottom of the grooves. This layer of metal should be one which contains acceptors and may be used to form a p-type layer on the semiconductor by the alloying process. Aluminum or an acceptor bearing alloy such as gold gallium are suitable metals to use for this purpose when silicon is the semiconductor.

The resulting structure has high conductivity perpendicular to the figure for both the emitter and the base region. In the case of the emitter the conductivity is formed by the layer of aluminum which extends over the entire surface. For the case of the base region the conductivity arises from the relatively thick and heavily doped ribs 37. The emitter base capacity is small over the ribs because of the insulating layer I.

It should be noted that the buildup of insulator on the sides of the grooves will tend to form projecting ridges which will shadow the sides of the grooves in the subsequent evaporation of metal. This effect may be utilized in further reducing emitter base capacity and in improving base resistance. This desirable result may be accomplished by allowing the ridges to build up to such a degree that the evaporated metal forms in separate strips, one lying at the bottom of the grooves and the other on the regions above the ribs. After the alloying cycle has occurred at the bottom of the grooves, the specimen may be polished down so as to expose the n(++) material at the top of the ribs. A subsequent evaporation of a metal film will then produce a metallic contact all along the ribs without producing a metallic path from the ribs to the emitter line.

The method of making contact to the device of Figure 10 is illustrated in Figures 12 and 13. Figure 12 represents a plane view and Figure 13 a cross section of the device. In this figure it is assumed that the evaporation of the insulating layer extends over an area much larger than the area of the grooves between the ribs. On the other hand the layer of metal is evaporated through a mask which restricts its area to essentially that of the grooves. Subsequent to the evaporation and alloying, the plane top surface of the device is bevelled 38 by lapping, polishing, or etching or a combination of these so as to expose the rib material, n(++). Contacts to this base layer may be made by subsequent evaporations and alloying or by masking and plating. Since the base layer is of very high conductivity, it is relatively easy to make low resistivity, substantially ohmic contacts to it. Contact to the collector may be made by plating or alloying 39 to the base of the block and subsequent soldering to metal leads or massive metal supports 41. The contacts to the evaporated emitter region M may be made by pressure contacts, soldering or welding. If the evaporated film is aluminum it may be advantageous to make the metallic contact at the same stage that the alloying process is occurring. Under these conditions, it will be relatively easy to penetrate the aluminum oxide layer which tends to form on aluminum. Alternatively, the layer of oxide may be broken by pressure combined with fine particles of abrasive or by puncturing the layer in the presence of molten solder with an electric spark of low energy. A spark will break through the oxide layer permitting the solder to wet the aluminum which will then result in good metallic contact.

Figure 15:
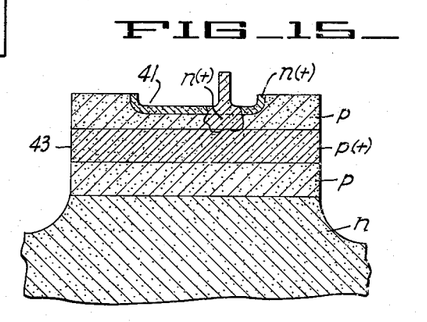
Figure 15 is a view taken along the line 15—15 of Figure 14.
Figure 16:
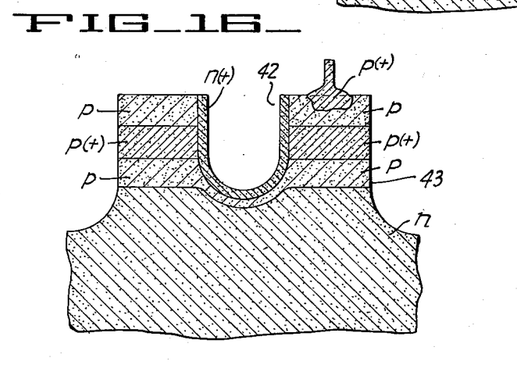
Figure 16 is a view taken along the lines 16—16 of Figure 14.

It is evident that although the methods disclosed above are suited to the preparation of relatively large area junction transistors, their value is not restricted to such cases. Thus the fabrication of relatively small area junction transistors can be substantially simplified by the use of the rib principle. An example of the use of the rib principle to construct a small area transistor is illustrated in Figures 14–16.

Figure 14:
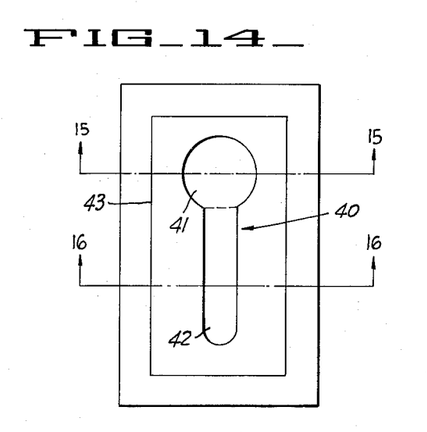
Figure 14 shows still another embodiment of the invention comprising a small area junction transistor.

The structure shown in Figure 14 is fabricated in a manner similar to that of Figure 8. Since the individual steps are similar to those of Figure 8 they are not represented in the diagram. As a first step, the rib structure is produced by diffusing a p-type impurity, for example boron and silicon, onto a smoothly polished n-type blank. (For purposes of illustrating the flexibility of the technique, the polarity is made opposite to that of Figure 8.) After this diffusion an emitter area is cut into the surface. The emitter area 40 consists of two regions 41 and 42, region 41 which is used for making contact to the emitter, and working region 42. The working region 42 is a deep groove. The contact region 41 is shallower.

Next donors and acceptors are diffused so as to form an n-type surface with a more deeply penetrating p-type layer. For example, aluminum and antimony may be used since aluminum diffuses more rapidly than antimony and the structure will result if both are diffused simultaneously. Subsequent to this operation, the entire specimen contains an n-type skin due to the antimony.

The next operation involves polishing the surface of the specimen so as to remove the n-type skin from the rib of the base region. Alternatively the grooves may be filled with an etch resisting material, such as a wax, excess wax removed from the tops of the ribs and the n-layer etched off the tops of the ribs.

Next cuts 43 are made either mechanically by lapping, or chemically by masking and etching so as to limit the extent of the rib of the base region. The resulting structure is shown in section, Figures 15 and 16. Referring to Figure 15, we see that the n(+) layer has been removed from the area over the rib. The n(+) layer lies at a sufficiently shallow depth in respect to the rib material so that it makes a relatively low capacity junction with the rib material since near the surface the rib material has been depleted by evaporation from the surface, as was discussed in connection with Figure 8D.

Also shown in Figure 15 is an alloy contact made to the n(+) layer. Since in the shallow region the n(+) layer lies upon a thick region of p-type material which is not very heavily doped at the p-n junction, an alloy contact can be easily made to it with a gold antimony alloy or other donor bearing alloy.

In Figure 16, the deeper portion of the groove containing the web or active area of the base is shown. Also shown is the base contact which is made to the p-type layer by alloying with an aluminum wire or an aluminum coated wire, for example.

The advantages of the rib technique in making junction transistors is apparent from Figures 14–16. It is seen that by the utilization of this technique, the problems of contacting the emitter and the base region have been materially simplified and the problem of geometrical control does not involve the evaporation of a metal area of controlled shape but is reduced to controlled etching or cutting. These operations can be carried out with a precision comparable to that involved in making ruled gratings which is quite adequate for making transistors of hitherto unattained performance. It is apparent that the method disclosed with reference to Figures 14–16 can be utilized for fabricating large area transistors of the type hereinbefore described.

The base structure of the invention need not consist of a series of parallel ribs only, but it is also practical to produce structures in which a set of heavy ribs run in one direction and are connected with a set of more closely spaced, somewhat lighter ribs running at right angles thereto. The main current path from a representative area of web to the base contact will be from the web to one of the narrow ribs and along the narrow rib to one of the heavier ribs and thence to the base electrode. Such structures may be particularly advantageous in large area high powered transistors.

It is evident from the foregoing description that in certain instances the web and rib regions may be formed of uniform thickness with the rib region having a substantially higher carrier concentration to increase the conductivity of the rib region of the base layer.

Although the description in general has been directed to silicon and germanium semi-conductive devices, the invention is not intended to be limited in this respect since other suitable semiconductors may be employed to form the junction transistor of the invention.

I claim:

1. A junction transistor including emitter, base and collector regions, and ohmic emitter, base and collector contacts thereto respectively, said base region comprising relatively low resistance rib portions and relatively high resistance web portions, said rib portions being in contact with the ohmic contact, said base ohmic contact being made to at least one end of the ribs whereby the average resistance from web to contact is substantially less than the average resistance from web to contact in a base in which the rib portion is replaced by web.

2. A junction transistor including emitter, base and collector regions and connections thereto, said base region formed with relatively thin portions and relatively thick elongated portions forming a relatively low resistance path to the base connection, said base connection being made with at least one end of the elongated portion, said emitter region extending over at least a portion of each of the thick elongated portions to form a junction therewith.

3. A junction transistor including emitter, base and collector regions, and connections thereto, said base region being formed with elongated rib portions and web portions, said base connection being made to at least one end of the elongated rib, said elongated rib portions forming a low resistance path to the base connection.

4. A junction transistor including emitter, base and collector regions, and connections thereto, said base region comprising a web portion which is adapted to operate at relatively high frequencies, and a rib portion forming a low resistance path, said base connection being made to at least one end of the rib portion, said emitter region extending over a portion of the rib portion and forming a junction therewith.

5. A junction transistor comprising a first zone of semiconductive material of one conductivity type, said first zone being formed as a web and rib structure, a pair of zones of semi-conductive material of opposite conductivity type contiguous with and on opposite sides of said zone to form a continuous junction therewith and means providing electrical connections to each of said zones, said connection to said first zone being at least with the ends of the ribs.

6. Apparatus as in claim 5 wherein said ribs have a relatively high carrier concentration.

7. Apparatus as in claim 5 wherein said web is relatively thin whereby the transistor is operable at relatively high frequencies, and wherein said ribs are relatively thick to reduce the resistance to the base connection.

8. A junction transistor comprising a first zone of semi-conductive material of one conductivity type and a pair of zones of semi-conductive material of opposite conductivity type contiguous with and on opposite sides of said first zone, ohmic contacts formed with said zones, said first zone comprising relatively low resistance rib portions and relatively high resistance web portions, said rib portions being in contact with the ohmic contact, whereby the average resistance of the first zone from web to contact is substantially less than the average resistance from web to contact in a zone in which the rib portion is replaced by web.

9. A junction transistor comprising emitter, base and collector zones, said base zone being formed as a web and rib structure, said rib structure comprising relatively thick ribs formed in a longitudinal direction and thinner ribs formed at right angles thereto whereby the main current path from web to rib will be from the thin to the thicker rib.

10. Apparatus as in claim 9 wherein said rib portions have a relatively high carrier concentration.

11. A junction transistor comprising emitter, base and collector zones with said zones forming a pair of junctions, said base zone including rib and web portions, said emitter base junction extending only over a portion of the rib area.

12. A junction transistor comprising emitter, base and collector zones, said base zone being formed by solid diffusion and including web and rib portions.

13. A junction transistor including a semi-conductive body having emitter, base and collector zones forming emitter base and base collector junctions, said base comprising a rib and web structure, the chemical charge density being substantially smaller where the base collector junction approaches the surface of the body.

14. A junction transistor as in claim 13 in which the gradient chemical charge density of the base-emitter junction is substantially smaller at the surface of the body.

15. A junction transistor including emitter, base and collector regions forming emitter base and base collector junctions, said base region including web and rib portions with the gradient of chemical charge density of the base-collector junction being less at the ribs than at the web.

16. A junction transistor including emitter, base and collector regions forming emitter base and base collector junctions, connections formed with said regions, said base region including rib and web portions with the rib portion in contact with the base connection, whereby the average resistance from web to connection is substantially less than the average resistance from web to connection if the rib portion is replaced by web, and wherein the gradient of chemical charge density at the base collector region is less at the rib portions than at the web portions.

17. A junction transistor including emitter, base and collector regions forming emitter base and base collector junctions, said base having relatively thick and relatively thin portions, a region forming an emitter base junction in which the chemical charge density is relatively low near the junction over a distance relatively large compared to the thin portion whereby an emitter contact may be easily made.

18. A junction transistor including emitter, base and collector regions, said base region comprising working web portions and rib portions having relatively high chemical charge densities providing a low resistance current path, said emitter region extending over the web portion and at least a portion of the rib portions and forming a junction therewith, and a base connection made with at least one end of the rib portions.

19. A junction transistor comprising a first zone of semiconductive material of one conductivity type, a second zone of semiconductive material of opposite conductivity type forming a junction therewith, said second zone having relatively thin elongated portions and relatively thick elongated portions, an insulating layer formed over said relatively thick portions, a metallic layer disposed over said insulating layer and forming a rectifying junction with the relatively thin portions, means forming ohmic connections with the relatively thick portions of said zone and means forming ohmic connection with the first zone.

20. A junction transistor as in claim 19 in which said relatively thick portions include a region of high chemical charge density.

21. A junction transistor including a first region of semiconductive material of one conductivity type, a second region of semiconductive material of opposite conductivity type forming a junction therewith, said second region including portions of relatively high chemical charge density, a groove formed in said second region, said groove having relatively deep portions and relatively shallow portions, a third region of semiconductive material of said first conductivity forming a junction with the second region in the groove, means forming ohmic contact with said third region in the shallow portion of the groove, means forming ohmic contact with the second region, and means forming ohmic contact with the first region.

22. A junction transistor comprising a middle zone having ribs formed on one surface thereof whereby the zone includes rib and web portions, a zone of opposite conductivity type provided on said one surface and forming a junction with the rib and web portions, and another zone of opposite conductivity type provided on the opposite surface of said middle zone, said zones of opposite conductivity type being provided with ohmic electrodes and said middle zone being provided with an ohmic electrode.

23. A junction transistor as in claim 22 in which the ribs have a relatively low resistance compared with other portions of the middle zone.

24. A junction transistor as in claim 22 in which the gradient of impurity atoms at at least one junction is less at the rib than at the web.

25. A junction transistor as in claim 22 in which the web is adapted to operate at relatively high frequencies.

26. A junction transistor as in claim 22 in which there is additionally provided thinner ribs forming an angle with said ribs whereby the current path from web to rib will be from the thinner ribs to said rib portions.

References Cited in the file of this patent

UNITED STATES PATENTS

| | | |
|---|---|---|
| 2,588,254 | Horovitz et al. | March 4, 1952 |
| 2,761,020 | Shockley | Aug. 28, 1956 |
| 2,761,800 | Ditrick | Sept. 4, 1956 |
| 2,837,704 | Emeis | June 3, 1958 |
| 2,858,489 | Henkels | Oct. 28, 1958 |

UNITED STATES PATENT OFFICE

CERTIFICATE OF CORRECTION

Patent No. 2,980,830 April 18, 1961

William Shockley

It is hereby certified that error appears in the above numbered patent requiring correction and that the said Letters Patent should read as corrected below.

Column 11, lines 24 and 25, for "lappinfi" read -- lapping --.

Signed and sealed this 28th day of November 1961.

(SEAL)
Attest:

ERNEST W. SWIDER
Attesting Officer

DAVID L. LADD
Commissioner of Patents